E. L. RIEHA.
GAS RETORT FURNACE.
APPLICATION FILED DEC. 4, 1908.
962,051.
Patented June 21, 1910.
4 SHEETS—SHEET 1.
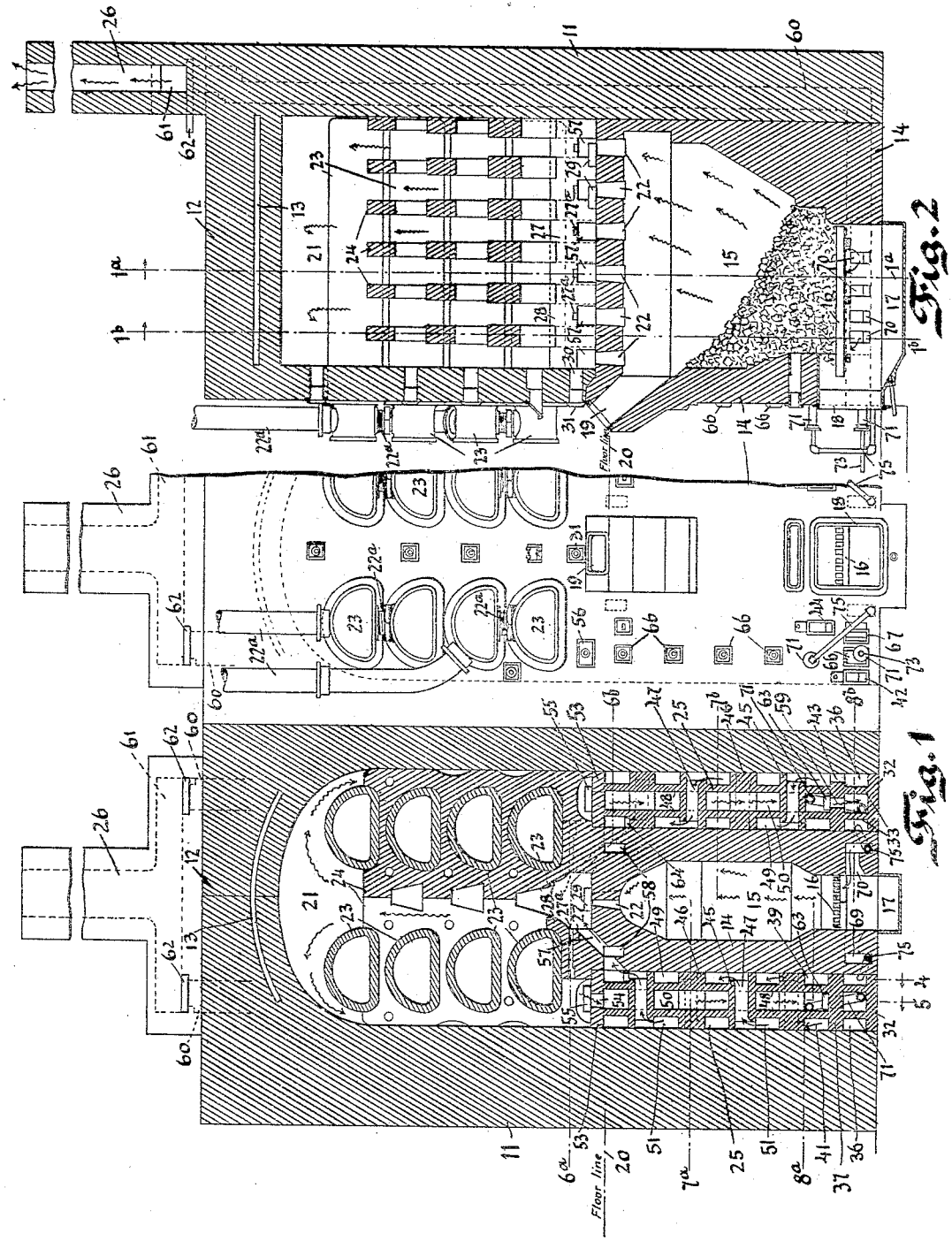

E. L. RIEHA.
GAS RETORT FURNACE.
APPLICATION FILED DEC. 4, 1908.
962,051.
Patented June 21, 1910.
4 SHEETS—SHEET 2.
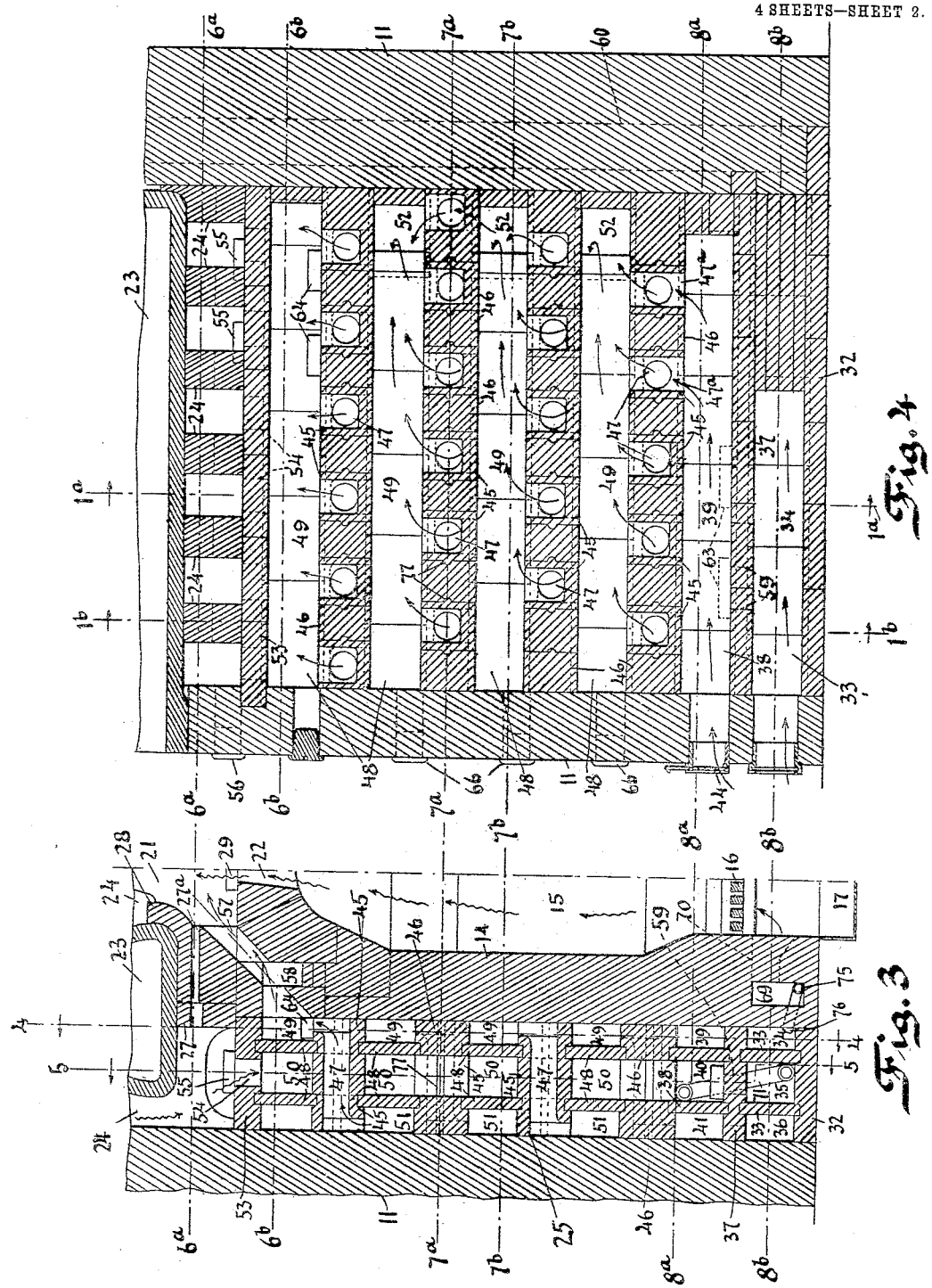
Witnesses
Jos. H. Gruber
Minnie D. Schienbein
Edward L. Rieha, Inventor
By George Wetmore Colles
Attorney

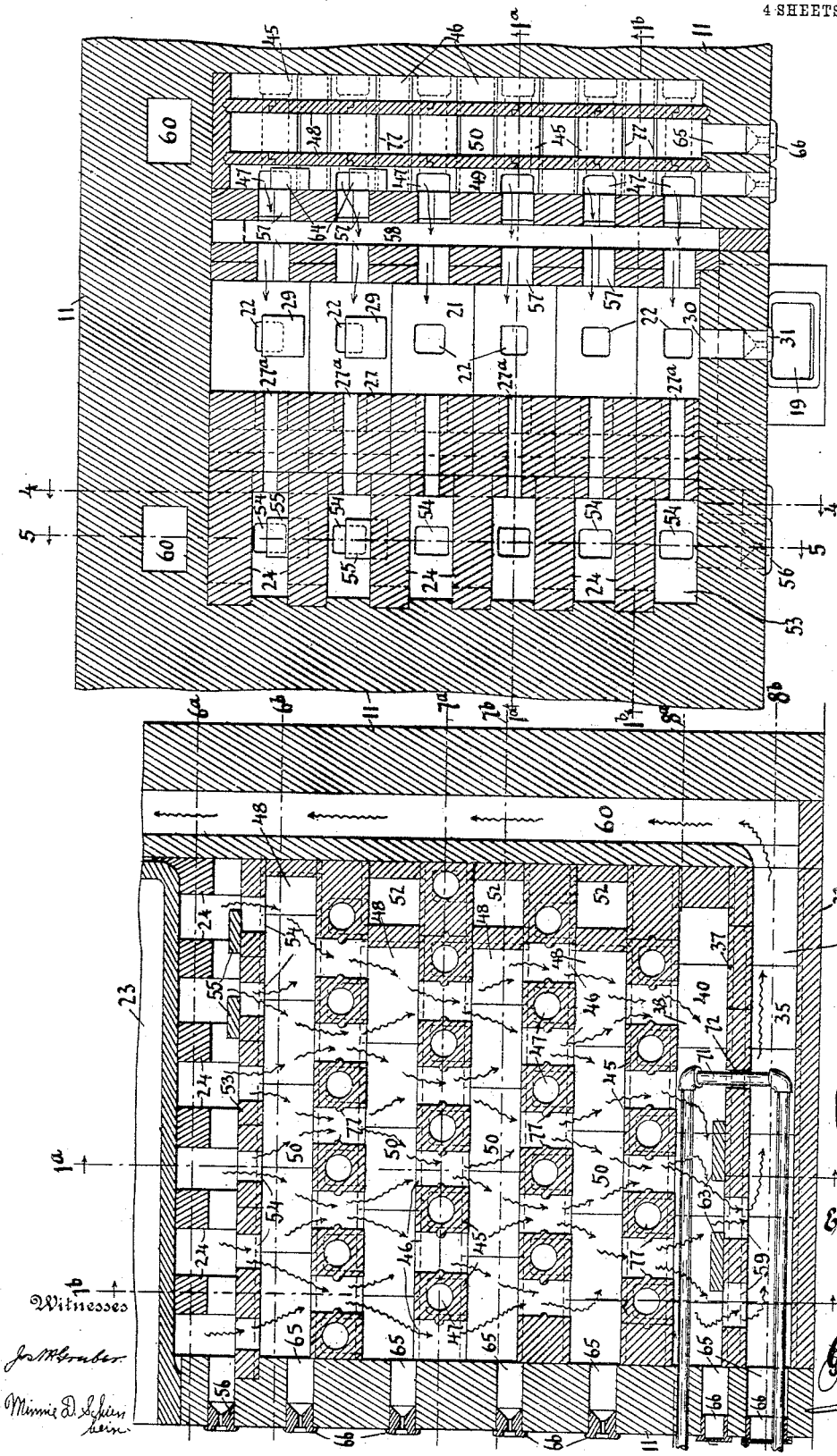

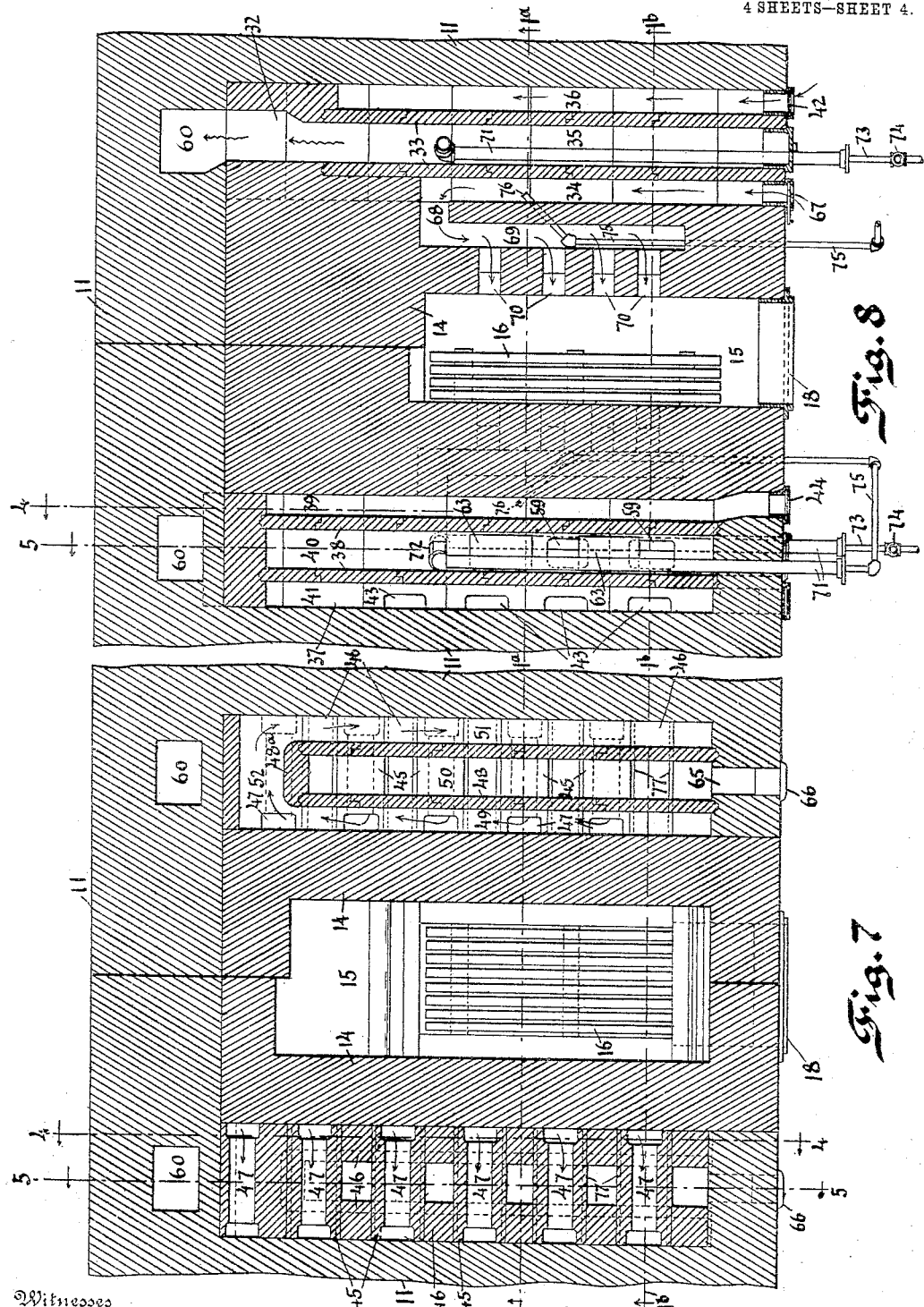

UNITED STATES PATENT OFFICE.

EDWARD L. RIEHA, OF MILWAUKEE, WISCONSIN.

GAS-RETORT FURNACE.

962,051.  Specification of Letters Patent.  Patented June 21, 1910.

Application filed December 4, 1908. Serial No. 465,978.

*To all whom it may concern:*

Be it known that I, EDWARD L. RIEHA, of Milwaukee, Wisconsin, have invented a Gas-Retort Furnace, of which the following is a specification.

This invention relates to improvements in the recuperators of gas-retort furnaces such as are used for the destructive distillation of coal and other substances in the production of coal-, oil-, and water-gas and their by-products. In the most modern furnaces of this class it is customary to produce the heat necessary for distillation by means of a furnace in which the air of combustion is introduced to the fuel in such limited quantities so as to produce only carbon-monoxid, this heated carbon-monoxid being subsequently burned to carbon dioxid in the gas-combustion chamber immediately surrounding the retorts, whereby the highest degree of heat is produced and transmitted to the contents of the retorts in the most economical manner. The air introduced in the second step of combustion, known as secondary air, is preheated in the recuperator by means of the waste gases of combustion, said recuperator consisting of a double set of passageways occupied by the incoming secondary air and the outgoing combustion-gases respectively. By reason of the high temperature of the recuperator it is necessary to construct it of refractory material such as fire-brick, which is a comparatively poor conducting medium and does not lend itself well to the construction of intricate passageways; hence a very large heating surface is necessary in the recuperator in order to attain a satisfactory efficiency.

The object of my invention is to improve the construction of the recuperator by providing a better arrangement of the air- and gas-passageways thereof, whereby a greater amount of heating-surface is provided within the same space, or the same amount within a lesser space, and to provide a construction whereby to a certain extent thinner partition walls may be used. In carrying out this object I provide a set of passageways for the gases of combustion which are completely surrounded by the passageways for the secondary air, thereby avoiding any loss in heat of said gases by transmission of the heat through dead walls.

I also aim to provide a construction of the passageways which admits of ready cleaning, and means for regulating the air- and gas-currents and causing them to be equably disposed throughout the length of the furnace, or throwing them toward the front or back of the furnace at will.

The various features of my invention will be best understood from the following detailed description of a concrete form thereof, reference being had to the accompanying drawings wherein, Figure 1 is an elevation of a complete gas retort furnace constructed according to my invention, said elevation being in three parts; the left-hand third being sectioned upon the plane 1$^a$, the middle third upon the plane 1$^b$, and the right-hand third being a front elevation of the furnace; Fig. 2 is a longitudinal central section through the furnace; Fig. 3 is a sectional elevation, similar to the left-hand third of Fig. 1, and on the same plane, of the left-hand recuperator of the furnace upon a larger scale to show the details of the recuperator; Figs. 4 and 5 are longitudinal sections through the recuperator on the planes 4 and 5 respectively; Figs. 3, 7, 8. Fig. 6 is a plan section of the furnace, the left-hand half being sectioned upon the plane 6$^a$ and the right-hand half upon the plane 6$^b$; Figs. 1, 3, 4, 5. Fig. 7 is a plan-section of the furnace, the left-hand half being sectioned upon the plane 7$^a$ and the right-hand half upon the plane 7$^b$; Figs. 1, 4, 5. Fig. 8 is a plan-section of the furnace, the left-hand half being sectioned upon the plane 8$^a$ and the right-hand half upon the plane 8$^b$; Figs. 1, 3, 4, 5. In Figs. 4, 6 and 7 the steam-generating apparatus is omitted, as are also some nonpertinent details in the construction of the furnace in all the figures.

In the drawings the smooth-lined arrows represent air-currents, while the waved-line arrows represent those of the products of combustion.

In these drawings every reference letter and numeral refers always to the same part.

Fig. 1 shows part of a battery of two or more furnaces of the same construction, and in the following description reference will be made to one furnace only. It may be observed further that this furnace is of bilateral construction, the two halves being symmetrical duplicates, and each having a recuperator, therefore, in referring to the recuperator, either one is meant and the same reference letters apply to each. It will be understood also that the various sections of the recuperator shown in the drawings apply to both the recuperators though each section is made of one only to economize space.

The general construction of the furnace here shown embodies an inclosing wall 11, arched over at 12 to form the roof, in which is an insulating air-chamber 13. This wall and roof may be constructed of any suitable material, generally the internal portions of fire-brick and the external portions of common brick masonry, but as this is a matter of engineering design, which has no relevancy to my invention, the details of the material used are not here illustrated. Within the inclosure of the wall 11 and in the lower part thereof is a second inclosing wall 14, which incloses the fire-chamber 15, provided with a grate 16 for the fuel, ash-pit 17, ash-door 18 and charging-hole 19, the charging floor being at the level 20, as shown in Figs. 1 and 2. In the upper part of the main furnace is a combustion-chamber 21, which communicates with the fire-chamber 15 by means of passageways 22 in the top of the latter, and in which are mounted the retorts 23, here arranged in two parallel stacks on opposite sides of the furnace, and supported in position by a number of fire-brick walls 24, which leave room between them for the circulation of hot gases around the retorts. The gas retorts are provided at the front of the furnace with delivery conduits 22$^a$ in the usual manner. In the lower part of the furnace and on either side of the fire-chamber are recuperators 25, through which the gases of combustion are obliged to pass in order to reach the chimney 26 at the rear of the furnace. The gases of combustion are prevented from passing from the passageways 22 direct to the recuperator by means of longitudinal walls 27 on opposite sides of the row of openings 22, these walls extending around the edges of the lowermost retorts to shield them from the intense heat of the gases, as shown at 28. Small transverse passageways 27$^a$ may be made at intervals in the walls 27, so that a small portion of the combustion gases may pass under the lowest retorts to make the heat thereof uniform with that of the other retorts. Over the holes 22, or some of them, are arranged removable blocks 29, which may be shifted so as to cover a greater or less portion of the several openings, and thus direct the furnace-gases toward the front or rear of the furnace and maintain an equable heating of the retorts. This is accomplished by thrusting a rod through an opening 30 in the front of the furnace, which is closed by a removable plug 31.

Each recuperator is built up in several superposed stories, as illustrated more particularly in Figs. 3 to 8 inclusive, comprising interlacing longitudinal and transverse passageways, which connect by vertical openings in the manner to be described. Starting at the bottom, upon the first floor-surfacing 32 of the recuperator are formed two upright longitudinal walls 33, dividing the interior into three chambers 34, 35 and 36 side by side, the first of which belongs to the primary air, or that which is supplied directly to the fuel on the grate 16, the second to the gases of combustion, and the third to the secondary air. These chambers are roofed in by a horizontal partition-wall 37 extending from front to rear and forming the floor of the second story, and upon this again are laid a second set of parallel longitudinal walls 38, dividing this second story of the recuperator into three chambers 39, 40 and 41, the first and last of which belong to the secondary air and the middle one to the gases of combustion. The chamber 36 is provided with a valved inlet-door 42 at the front of the furnace and communicates with the chamber 41 immediately above it by apertures 43 in the horizontal partition-wall 37; and the chamber 41 has also a valved inlet-door 44. The floors of the third and following tiers or stories of the recuperator each comprise a series of hollow or tubular tiles 45 placed transversely across the walls 38 and alternating with blocks 46, which do not extend all the way across the recuperator, but only cover the lateral chambers 39 and 41, as is clearly shown by the left-hand side of Fig. 7. The tiles 45 have longitudinal passageways 47, which at the outer end, or that distant from the fire-chamber, open downwardly to the lateral chamber below (see Fig. 3) and at the inner end open upwardly into the lateral chamber immediately above. The third and following stories of the recuperator are each divided by longitudinal walls 48 into three chambers 49, 50, and 51, and the horizontal partitions between the stories are formed of alternating tiles 45 and blocks 46, as already described for the third story. I consider it preferable to stagger the tiles 45 in the successive rows, as shown in Figs. 4 and 5, so that the tiles 45 in one row are located opposite the blocks 46 in the rows above and below it, and vice versa. It should be noted that, while the chambers 39 and 41 in the second story previously described are closed at the rear end, in all the succeeding stories, the middle chamber 50 is closed at the rear by a separate transverse block 48$^a$, leaving an open passageway 52, which connects the two lateral chambers 49 and 51 at the rear. Also, some or all of the hollow tiles 45, in the lower tier of these tiles immediately above the air-chamber 39, have the inner end opening both above and below as shown at 47$^a$ in Fig. 4 (in this figure only the two rear tiles are shown as so opening), thus giving communication between the admission-chamber 39 of the secondary air and the chamber 49 immediately above it.

At the top of the recuperator, in the horizontal partition-wall 53, which separates it from the combustion- or retort-chamber 21, are formed apertures 54, which give communication from the combustion-chamber to the central chamber 50 of the recuperator, and one or more of these apertures may be partially closed by movable blocks 55 for the purpose of regulating the passage of the gases and keeping them equably distributed among the several apertures, said blocks being moved as desired by means of a rod thrust through a cleaning opening closed by a plug 56 at the front of the furnace.

At the inner side of the recuperator, the uppermost chamber 49 communicates by a series of oblique passageways 57 with the center of the combustion-chamber, flanking the passageways 22, and these oblique passageways are united together by a longitudinal equalizing-chamber 58, which connects them longitudinally and serves also to collect dust in the air and prevent it from falling back into the recuperator.

From the above description it will be seen that the course of the secondary air is as follows: A portion of the secondary air enters on the first story of the recuperator at the valved opening 42, thence and from the lateral chamber 36 rises through the apertures 43 into the second-story lateral chamber 41, and from this latter chamber, entering the outer ends of the passageways 47 in the tiles 45, passes tranversely across the recuperator, emerging into the inner chamber 49 of the third story. The latter chamber being closed at all points except at the rear, the air is obliged to pass rearwardly around the end of the central chamber 50, through the passageway 52 and into the third-story chamber 51. From the chamber 51 the air likewise passes up through the open ends of the passageways 47 in the next row of tiles 45, emerging in the fourth-story chamber 49, thence around the rear end through the passageway 52 into the fourth-story chamber 51, and so on through the succeeding stories until it reaches the top chamber 49, whence it issues through the passageways 57 into the combustion-chamber. It will be observed that the secondary air as it issues is directed at each side in a series of vertical jets against the current of carbonic oxid issuing from the fire-chamber through the passageways 22, thus thoroughly mixing the gases together and producing the highest temperature of combustion. The gases as they burn naturally rise in the center, and reaching the roof of the combustion-chamber, are turned back on the outer walls thereof, passing down on the outer side of the retorts to enter the passageways 54, while a portion of the burned gases will, of course, take the routes between the several retorts, whereby the latter are entirely surrounded by the heated gases.

On entering the recuperator through the passageways 54 the burned gases emerge into the chamber 50 of the top story, thence pass between the row of tiles 45 to the next story below, and so on down until the second story is reached, all as clearly shown by the wave-lined arrows of Fig. 5. It will be observed that the gases in passing between the tiles of any one story are projected against the tiles of the next story below so as to be brought into contact with them and to give up the maximum quantity of heat. On reaching the second story, the gases of combustion pass through apertures 59 in the floor thereof, emerging into the central lowermost chamber 35, which is connected at the rear end with the flue or stack 60, which delivers the gases to the chimney 26. The two flues 60 on opposite sides of the furnace are brought together at the chimney by means of a horizontal flue 61, between which on the flues 60 are interposed sliding valves or dampers 62.

The apertures 59 in the floor of the chamber 40 are preferably provided with sliding blocks 63, which may be adjusted to cover the apertures to a greater or less extent, and the rearmost openings of the passageways 47 in the uppermost row of tiles 45 are in like manner shown as covered by sliding blocks 64. The central chambers 50 for the combustion-gases are provided at each story with a cleaning opening 65 closed by a plug 66, as shown in Fig. 5.

The primary air, after entering the first floor chamber 34 through the valved-inlet door 67 at the front end thereof, passes by a transverse passage 68 in the rear end into a parallel chamber 69, formed within the wall of the fire chamber, this parallel chamber 69 having a plurality of passageways 70, which communicate with the furnace directly below the grate thereof, as clearly shown on the right-hand side of Fig. 8. Thus the primary air, by its juxtaposition with the gas-chamber 35 and the fire-chamber, is to a certain extent preheated before reaching the fuel.

For the purpose of better combustion and developing a larger proportion of the total heat in the combustion-chamber, it is desirable to inject a certain proportion of steam or water-vapor along with the primary air below the fuel, and for this purpose I provide a steam-generating device comprising a U-shaped pipe 71, the two limbs of which lie respectively in the first- and second-story gas-chambers, an aperture 72 being formed in the wall 37 for the passage of the middle limb of the pipe. The lower limb of the pipe is connected with a water-supply pipe 73, provided with a valve 74, and the upper limb of the pipe 71 is connected with a steam-supply pipe 75, which, as shown in Fig. 8, is turned so as to enter the primary air-chamber 69, and the end 76 passes obliquely through the side wall of said chamber into the chamber 34, where the generated steam is delivered, becoming thoroughly incorporated with the primary air before the latter reaches the fuel. It will be seen, therefore, that the heat of the waste gases is utilized not only for heating the primary and secondary air but also for developing the steam used for injection with the primary air. Further, according to my construction, the gases of combustion are surrounded at substantially all points in their outward passage through the recuperator with air-chambers, in which either primary or secondary air is caused to take up the heat, so that there are no dead walls in which heat is wasted, such as are present in other recuperators.

It will be seen from the drawings that the structure of the members constituting the walls and floors of the recuperator are interlocking at every point; for example, the hollow tiles 45 are provided with tenons 77 on the sides, which interlock with corresponding grooves or mortises in the blocks 46, and in like manner the tiles 45 and blocks 46 are grooved in their upper and lower sides to receive the edges of the tiles forming vertical partition walls. Thus I am enabled to carry out the above described construction in a strong, satisfactory, and substantially gas-tight manner.

While I have hereinabove shown the most improved form of my invention, I wish it understood that not all of the features are essential thereto or necessarily made in the exact form shown, but various changes and modifications in the constructions as herein shown may be made without departing from the spirit of my invention, and I wish it understood therefore that the latter is not otherwise limited than by the reasonable scope of my claims.

Having thus described my invention, what I claim as new and desire to secure by Letters Patent is:

1. In a recuperator, the combination of a set of passages for the combustion-gases in the form of a flattened sheet, flanked by a set of passages for air in two flattened sheets on opposite sides of and completely covering said first flattened sheet; said last-named set of passages consisting in a plurality of air chambers communicating from side to side by transverse passages across said first set of passages in a direction at right angles thereto.

2. In a recuperator, a set of passages for combustion-gases in the form of a flattened sheet, and a second set of passages for air in the form of two flattened sheets flanking and completely covering the opposite sides of said first flattened sheet; said second set of passages comprising a plurality of air-chambers on opposite sides of said first set of passages, a plurality of passageways passing transversely across said first set of passages and connecting air-chambers on opposite sides of said first set of passages, and other passageways around the end of said first set of passages connecting air-chambers on opposite sides thereof; the air passing from one chamber to the next by one or more of said transverse passageways, and from that to the next succeeding by one of said passageways around the end, and so on indefinitely.

3. A recuperator comprising a series of stories divided by horizontal partitions and each story divided by a pair of longitudinal walls into three chambers; the middle chamber being cut off from the two lateral chambers, and the latter being connected together by a passage around the end of the middle chamber; said horizontal partitions comprising a plurality of tubular members which have tubes opening at one end into the lateral chamber on one side of the story below and at the other end into the lateral chamber at the other side of the story above, said tubular members leaving apertures between them which form passageways between the central chambers on the different stories, and each of said lateral chambers being completely closed to those immediately above and below it; means for the passing of hot gases through the central set of chambers and means for passing air through the lateral sets of chambers, said air passing successively from one lateral chamber through said transverse tubular members to the opposite lateral chamber on the next adjacent story, thence around the central chamber to the other lateral chamber on said story, and so on indefinitely.

4. A recuperator comprising a series of stories divided by horizontal partitions and each story divided by a pair of longitudinal walls into three chambers; the middle chamber being cut off from the two lateral chambers, and the latter being connected together by a passage around the end of the middle chamber; said horizontal partitions comprising a plurality of tubular members which have tubes opening at one end into the lateral chamber on one side of the story below and at the other end into the lateral chamber at the other side of the story above, said tubular members leaving apertures between them which form passageways between the central chambers on the different stories and each of said lateral chambers being completely closed to those immediately above and below it; means for passing hot gases downwardly through said central chambers from top to bottom, and means for passing air upwardly through said lateral chambers and transverse passageways from bottom to top, said air passing from one chamber into and through said transverse tubular members into the opposite lateral chamber on the story next above, thence around one end of the central chamber to the lateral chamber on the opposite side of the same story, thence through the next succeeding tubular member in the same manner and so on indefinitely.

5. In a device of the class described, a partition-wall comprising a plurality of hollow tiles each having a longitudinal passageway opening at one end on one lateral face and at the other end on the opposite lateral face of the tile, alternating with a plurality of solid blocks, in combination with a chamber into which one end of each of the tiles opens and a second chamber into which the other end of each tile opens.

6. In a device of the class described, a partition wall comprising a plurality of hollow tiles each having a longitudinal passageway opening at one end on one lateral face and at the other end on the opposite lateral face of the tile, alternating with a plurality of solid blocks, said solid-blocks leaving openings between said hollow tiles intermediately thereof; in combination with a pair of chambers on opposite sides of said last-named openings and communicating by means of the latter, and a second pair of chambers one of which communicates with one end of the passageway in each tile and the other with the other end of each such passageway.

7. In a recuperator, the combination of a plurality of passageways for air, a plurality of adjacent passageways for hot gases, steam-generating means comprising a closed vessel passing through said last-named passageways, a water-supply for said closed vessel, a furnace for the combustion of fuel, a primary air-chamber located adjacent to said passageways for gases, passageways communicating between said primary air-chamber and said furnace, and a steam injection-pipe leading from said generating-means into said primary air-chamber.

8. In a recuperator for gas-retort furnaces, the combination with a fire-chamber and a recuperator adjacent to the side thereof, said recuperator comprising a series of interconnected chambers one above the other, a combustion-chamber surmounting said fire-chamber and connecting therewith and connected also with the upper one of said interconnected chambers of the recuperator, an uptake or flue connected with the lower one of said interconnected chambers, two tiers of air-chambers flanking said first-named chambers on opposite sides thereof, transverse passages across said central set of chambers from the air-chambers on one side to the air-chambers on the other, connections around the end of said central set of chambers between the air-chambers on one side and the air-chambers on the other, intakes for air at the lower end of said air-chambers, and passageways from the upper of said air-chambers into said combustion-chamber; the air passing through said intakes from one of said lateral chambers across said transverse passages into an air-chamber on the opposite side of said central set of chambers and thence around the end of said central set of chambers to an air-chamber on the other side thereof, thence through said transverse passages to the next higher air-chamber on the other side, and so on upwardly until the air emerges into the combustion-chamber.

9. In a gas-retort furnace, in combination with a fire-chamber, a duct for primary air lying adjacent thereto, said duct comprising a primary air-chamber having an intake at the front end of the furnace and passing toward the back, thence returning on itself and terminating near the front end of the furnace, one or more ducts leading from said last-named portion of said air-duct into said fire-chamber, and a steam-pipe passing through said last-named portion of the air-duct and delivering steam at a point in the intake portion of said duct.

10. In a gas-retort furnace, in combination with a fire-chamber and a duct for the gases of combustion adjacent thereto, a duct for primary air between them and lying adjacent to both, said duct comprising an inlet air-chamber having an intake at the front end of the furnace and passing toward the back adjacent to said passage for combustion-gases, thence extending toward said fire-chamber, thence forwardly again adjacent to said fire-chamber and terminating near the front end of the furnace, a plurality of branch ducts leading from said last-named portion of said air-duct into said fire-chamber, and a steam-pipe entering the closed end of said last-named portion of the air-duct and passing through the wall thereof and delivering into the intake portion thereof.

11. In a gas retort furnace, the combination with a fire-chamber and a retort chamber surmounting it, a longitudinal series of openings from said fire-chamber to said retort chamber, a longitudinal series of passages for the admission of secondary air to said retort-chamber, said passages opening adjacent and parallel to said first-named longitudinal series, means for adjustably disposing the quantity of gases passing through the various openings of said first longitudinal series and means for in like manner adjustably disposing the quantity of air entering at the several passages of said second longitudinal series.

12. The combination with a gas-retort furnace of passageways adjacent to the combustion-chamber of the furnace through which the products of combustion from said furnace are led, air-passages interposed between said passageways and combustion-chamber, steam generating means comprising a closed vessel heated by said products of combustion and delivering into said air-passages at a point distant from the delivery-end thereof whereby the issuing steam is caused to be mixed with said air and heated jointly therewith as it passes through said passages, and a water supply for said closed vessel.

13. In combination with a gas-retort furnace, passageways connected with the combustion-chamber thereof and through which the products of combustion pass, air-passageways adjacent thereto and heated by said products of combustion, said air-passages delivering into the combustion-chamber of said furnace, steam generating means comprising a closed vessel disposed in said first-named passageways and heated by said products of combustion and delivered into said air-passages at a point distant from the delivery-end thereof, and a water-supply for said closed vessel.

In witness whereof I have hereunto set my hand this first day of December, 1908.

EDWARD L. RIEHA.

Witnesses:
GEORGE W. COLLES,
JAS. L. WARNER.